US007107528B2

United States Patent
Gerstl et al.

(10) Patent No.: US 7,107,528 B2
(45) Date of Patent: Sep. 12, 2006

(54) AUTOMATIC COMPLETION OF DATES

(75) Inventors: Peter Gerstl, Holzgerlingen (DE); Brian Heumann, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 10/682,400

(22) Filed: Oct. 9, 2003

(65) Prior Publication Data

US 2004/0123240 A1  Jun. 24, 2004

(30) Foreign Application Priority Data

Dec. 20, 2002  (EP) ................................ 02102874

(51) Int. Cl.
*G06F 17/24* (2006.01)
(52) U.S. Cl. ...................................... 715/534
(58) Field of Classification Search ................ 715/534
See application file for complete search history.

(56) References Cited

U.S. PATENT DOCUMENTS

| 6,353,447 | B1* | 3/2002 | Truluck et al. ............. 715/705 |
| 6,882,986 | B1* | 4/2005 | Heinemann et al. ........... 705/40 |
| 2002/0138477 | A1* | 9/2002 | Keiser ............................. 707/3 |
| 2004/0021686 | A1* | 2/2004 | Barberis ...................... 345/738 |
| 2004/0215467 | A1* | 10/2004 | Coffman et al. ................ 705/1 |
| 2004/0261025 | A1* | 12/2004 | Rizk et al. ................... 715/530 |

OTHER PUBLICATIONS

Microsoft Word 2000, © 1999.*
Supnik, Paul D., "Citation programs check your cites and generate alphabetized and formatted tables of authorities" in Los Angeles Lawyer Magazine, © Jun. 1989.*
CheckCite 4.0 for Windows, The Definitive Citation Checker User Manual, Chapter 2—"What CheckCite Can Do" (© 1994).*

* cited by examiner

*Primary Examiner*—Doug Hutton
(74) *Attorney, Agent, or Firm*—Marilyn S. Dawkins; Amy J. Pattillo

(57) ABSTRACT

The present invention relates to electronic information processing. In particular, it relates to a method and system for processing a document, which comprises text information, comprising monitoring the occurrence of incomplete time-related citations, in particular the citation of a date, within the text information, and completing said incomplete citation. In order to improve methods of automatic completion of time-related citations in documents, the inventional method completes incomplete citations of a date, within a text of a document by applying (160) a set of predetermined completing rules by using all time information relating to the document. The sources of time information are the text itself, the document "container" and the enclosing applications e.g. a word processor. Thus, e.g. search engines can find such documents in the Internet by entering any complete or incomplete dates. Using an index can optimize and speed up the search for relevant documents.

14 Claims, 2 Drawing Sheets

AUTOMATIC COMPLETION OF DATES

1. BACKGROUND OF THE INVENTION

1.1. Field of the Invention

Figure 1:
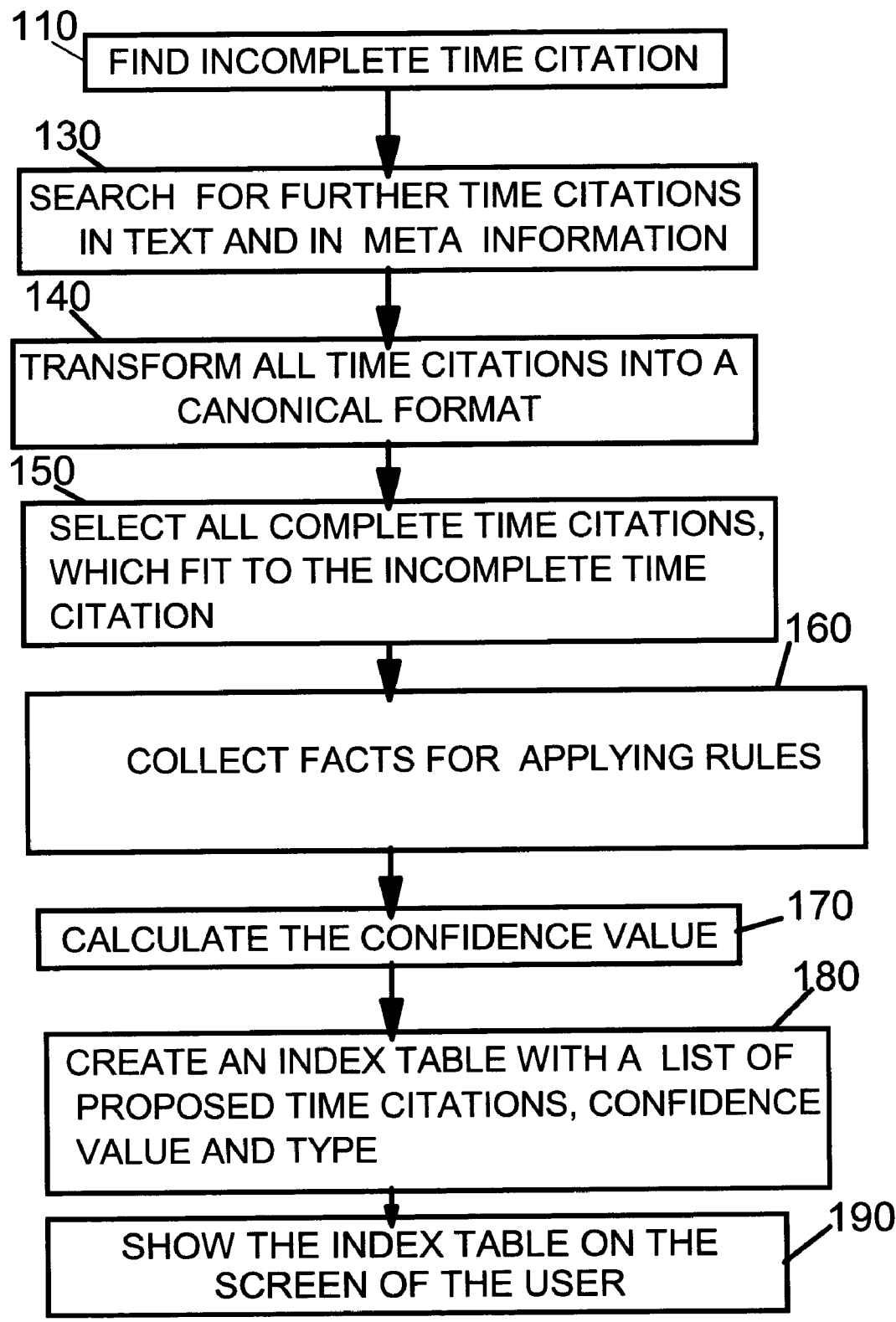

The present invention relates to electronic information processing. In particular, it relates to a method and system for processing a document, which comprises text information, comprising monitoring the occurrence of incomplete time-related citations, in particular the citation of a date, within the text information, and completing said incomplete citation.

1.2. Description and Disadvantages of Prior Art

Today many kinds of information are digitized and stored in electronic archives, as e.g., in a database. A large portion of such information comprises text, i.e. documents in one or more languages containing words and dates.

The usability of such electronic archives, however, is dependent of the fact in which way those documents are indexed, as the index serves often for locating a document. Often users need to find documents that are relevant for a particular date or date range.

A problem is, however, that it is not clear, which date to use for the search, e.g. the date, at which the document was archived electronically, or the date, when the content of the document was generated by its author, or when it was published, etc.

Content-related dates are often incomplete, e.g., "25 of march", or "in February this year". "This year" is a vague time-related citation, the reason why this date cannot be used in prior art for indexing purposes or other purposes, in which it is important to know the precise year of the date.

A prior art text search method is known from many word processor program applications. It comprises "full text search". In this case, the whole content of a document is parsed in order to find a useful date indication, which could meet the search pattern condition. The disadvantage is that an incomplete date occurring in the text of a document will not be in the hit list, because the existing technology requires a 1:1 match in the letters and symbols. For example a query "25/3" requires the document to contain the exact sequence of the letters "2", "5", "/", "3", etc.

In prior art it is known to transform many different representations of time information into a unified format, in order to make them comparable by the computer. One example for such a canonical time indication can be a language independent date format like "DD.MM.YYYY" as defined in the ISO 8601:2000 standard.

Also in this prior art approach there is no mechanism to handle or complete incomplete date information: If a date indication relating to or comprised of the text of a document is incomplete, because the year indication is missing, for example, prior art completion methods are limited to an obvious completion, e.g., with the current year indication "YYYY".

1.3. OBJECTIVES OF THE INVENTION

It is thus an objective of the present invention to provide a method and respective system for processing a document by completing an incomplete date citation automatically and in non-obvious cases, in order to render it usable for selectively storing and/or searching by complete or incomplete dates.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

In short words, the inventional method is able to complete incomplete citations of a date, within a text of a document by applying a set of predetermined completing rules and using all time information relating to the document. The sources of time information are the text itself, the document "container" and the enclosing applications e.g. a word processor, the computer system, the locale information. Creating an index from a completed date represents a preferred use according to the inventional method after selectively storing, for searching such documents. Thus, e.g. search engines can find such documents in the Internet by entering the completed date as a keyword.

Further, the present invention is not limited to be applied for the completion of incomplete dates. Instead, it can be used also for completing time indications as e.g., "this afternoon", "today", "within the holidays of Christmas", etc. In this document we use date and time interchangeably to denote an instance or range of temporal entities like date or time.

Thus, with reference to the appended claims the present invention discloses according to its broadest aspect a method for processing a text document comprising text information, having the steps of:

a) monitoring the occurrence of an incomplete, time-related citation, in particular the citation of a date, within the text information, and b) completing said incomplete citation, whereby the method is characterized by the step of:

c) automatically completing said time-related citations, or "indications" in the above context, by a supplemental time specification, by applying either one or more of:

c1) a set of predetermined completing rules establishing for a given incomplete citation prioritizing relationships between other time-related citations within the text information of the same document, c2) prior art data mining technology procedures, or c3) using context meta information from outside the document.

It should be understood that the inventional method comprises to look for supplemental time information within and outside the document. "Within" or "inside" means the whole actual content, i.e. the text of the document. "Outside" the document concerns the environment in which the document is stored. This might be a file system, a database table, a physical file, etc. Any of them can be used as a source showing some date indication or time-related information for the purpose of completing dates automatically according to the present invention.

Date indications in relation to a document are thus located in several sources. They can be found and evaluated according to the present invention in any electronic information, for example:

In the enclosing application like a word processor,

In the operating system providing information about access, creation and modification time, e.g. through a file system, logging- or tracing system, in form of a send/create/ or receive date in messaging systems, e.g. mail daemons, embedded in the document/content itself, ie, from the textual context itself.

Another important source for completion data is the distance, measured in words or the like, between the incomplete date occurrence and another complete date occurrence or fragment of the incomplete citation in the text. The shorter the distance between one date and another, the more probable is that missing information in one date fragment may be completed with the help of the other date occurrence.

The above mentioned sources may result in completion rules. Any rule may comprise several kinds of sources for proposing the correct supplemental time information. In fact, many sources may be combined to complete a date fragment. For each source, a rule may be defined, e.g. "fill in the missing year information from the file's creation date". One can give each rule (or source) priorities or weights in order to determine the most relevant date completion rule.

With such rules, the completion of dates can be computed automatically with no or little user interaction. With the automatic completion or proposal thereof, the user needs not to deduce the correct complete date out of the given sources for date information. The user can get a list of proposals, i.e., suggestions of supplemental time specification, ordered by probability of fitting according to the priorities or weights of the rules applied.

The quality of the completion rules is important for the confidence in the correct supplementing date specification. The completion rules may be different from one field of application to the next to produce the best possible results.

Thus, according to the invention the document can be related to one or more completed dates. It can be linked with other documents that also relate to the complete dates, if desired. That means the linked documents may become a source to complete missing date information.

Thus, searching for the document with the criterion of the completed date is possible for search engines in networks like the Internet. Links to other documents can then advantageously be used to complete missing date information.

Another advantageous embodiment comprises the step of creating an index from a completed date, usable for selectively storing and/or searching for the document relating to the completed data citation. Thus, the document can be stored in a data carrier by using an historical index. The document can be found under either the completed date or a date range (as specified by an incomplete date like "in January, 1967").

An advantageous feature of the inventive method further comprises the step of providing an index for different types of meta information e.g., a) the date of publishing the document, or
b) the date of processing the document, or
c) the date of creating the document.

In such case a completed date is enriched by an additional information referring to the type of meta information which served as information source to complete the incomplete date. A linkage between those types and the date itself and/or its context allows a weighting of analysis results when presenting multiple completion proposals to the user. Thus, for example, a linkage between "date of processing (in a text processor program) and the incomplete citation "January 1924" may lead to a low probability that the electronic document in question having the incomplete date is processed in the year of 1924 as at this time no computer-based text processors existed.

A further advantageous embodiment comprises the step of providing a user interface means for specifying a search for documents by means of said indexes. By that a user has an easy and comfortable means for applying said inventional methods.

Yet another advantageous embodiment further comprises the step of:

exposing to the user one or more possible time specifications, each accompanied by an indication of confidence, reflecting the value of confidence that a proposed supplemented time specification reflects the truth.

A value of confidence illustrates usually the probability to the user, that the supplemented time specification is the correct completion of the incomplete time information.

Thus, the user has an indication of confidence, e.g., 80%, or "greater than 80%", etc. in the listed dates. He may choose manually one of the listed dates without restriction to the most confidential one.

Thus, the user receives useful additional information. The confidence value can depend on different factors like the number of appearance of the proposed date in the text and the distance between this date and the incomplete date in the text. Also, the type of source as they were mentioned above, may be selected to influence the value of confidence. The user may also enter a minimum value of confidence as required to produce a proposal for completion. Thus, in a respective document search based on completed dates according to the invention, only such documents will be shown, which have a higher confidence value for the relationship with the specified date.

3. BRIEF DESCRIPTION OF THE DRAWINGS

Figures 2, 3:
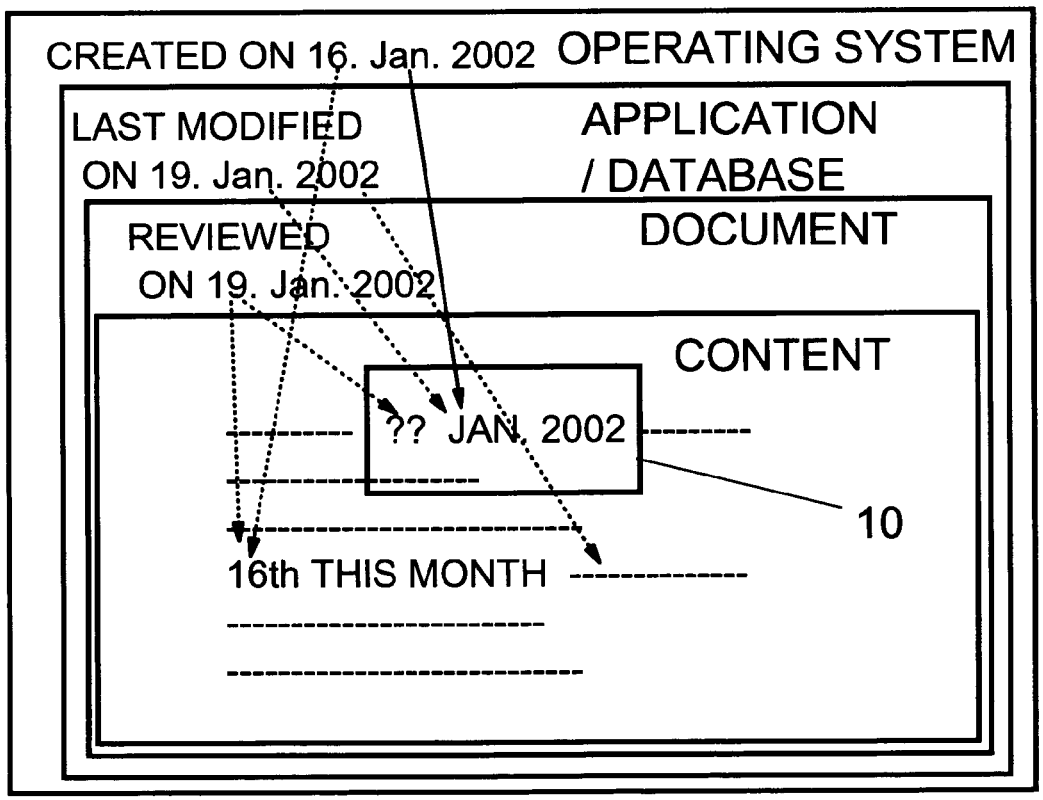

The present invention is illustrated by way of example and is not limited by the shape of the figures of the drawings in which:

FIG. 1 is a schematic flow chart representation illustrating the control flow during the completion of an incomplete time citation according to an inventional embodiment, FIG. 2 is a schematic drawing of a table of indexes according to an inventional embodiment, and FIG. 3 is a schematic drawing illustrating the different sources for automatic completion of dates according to the invention.

4. DETAILED DESCRIPTION OF THE PREFERRED EMBODIMENT

With general reference to the figures and with special reference now to FIG. 1, a document containing text is subjected to a preferred embodiment of the inventional method. It should be noted that preceding steps of scanning the text and character recognition have been done already in a preceding procedure, if this should be necessary.

In a first step 110 an incomplete time citation is found in a document. That can be done with a prior art text parser engine. The incomplete time citation is assumed to be "July, 14", and the missing indication of the year shall be automatically completed according to the present invention.

In a next step 130 the inventive tool searches for further time-relevant information. A particular prior art subprogram may do this. This subprogram has preferably incorporated prior art text mining technology for locating and identifying further time citations from the content of the text, i.e., text-embedded time citations. This algorithm may be assumed to find three further time-related citations, which are stored temporarily together with other relevant information, e.g., the distance (in words) from the incomplete citation.

Thus, the following is assumed to be found within the text:

a) Jul. 30, 2000, distance: 5 words before,
b) Oct. 31, 2001, distance: 33 words after,
c) Jan. 12, 2001, distance: 67 words after.

Then, further time citations are searched within the above mentioned "meta information". As the document is assumed to be scanned-in from a paper original, the scan (and store) date of the electronic file within the file system is found by a respective request to the Operating System of the server in use, to be:

d) Feb. 12, 2002.

Each found time information a) to d) is transformed into a canonical format e.g. according to DD.MM.YYYY, in step 140. Thus, the dates can be easily compared by an appropriate algorithm.

In a subsequent analysis step 150 the inventive program tool compares all this complete time information with the incomplete time citation. The time distance is determined and set in relation to the incomplete date. This may include advantageously to create an ordered list of dates, as mentioned above originating from the enclosing application, from the document container, or from embedment within the text.

Next, the collecting of relevant facts according to the inventional approach will be described in more detail: With additional reference to FIG. 2, in step 160 (of FIG. 1) the inventive program collects all relevant facts for calculating a confidence value 7, for each completion proposal based on the respective time information a) to d), see ref. sign 5 in FIG. 2. Such facts can comprise the source of the time information, e.g. the document itself or the related electronic or physical file, and/or the distance to the incomplete time citation in the text, and/or the number of similar or identical appearance in the text, e.g., 5 times "2002" were found in the text", etc.

Here is a more extensive list of the proposed mechanism to calculate completion candidates and confidence values:

A citation E2 qualifies as candidate for the completion of the incomplete time citation E1 depending on the following Criteria c:

A. Distance-based:

c1: The number of boundaries that separate textual units between E1 and E2
textual unites may be:
  words/tokens
  sentences
  paragraphs
  chapters, sections, subsections and the like;

c2: The number of topic-changes passed when moving from E1 to E2. Each topic might be represented by a set of typical terms or key words. Topics can for example be detected by clustering higher-level textual units such as groups of sentences, paragraphs or sections;

c3: The number of time expressions occurring between E1 and E2
  that refer to the same year or year/month as E2
  that refer to a different year or year/month as E2 if E2 appears in a document that is different from the one in which E1 appears but related via links or references:

c4: The number of links between the respective documents corresponds to the level of indirection;

B. Other:

c5: The level of compatibility between E1 and E2, assume E1=D1.M1.Y1 and E2=D2.M2.Y2, * means unknown; an example of this criterion could look as follows:

D1=D2, M1=M2, Y1=Y2>D1=*, M1=M2,
  Y1=Y2>M1=M2, Y1=Y2>M1=*,
  Y1=Y2>Y1=Y2 c6: The confidence level associated with E2, if E2 has been obtained by automatic completion;

c7: The frequency of occurrence of time expressions with the same year, year and month within E2's container (document, document collection, or context of use);
if E2 has been obtained from the context, in which the document containing E1 is used (e.g. database, http header, . . . ), c8: The reliability and usefulness of E2's source for providing candidates c9: for structured documents:
The importance of E2 within document (e.g. date stamp in letter)

Each of these criteria c1 to c9 (i=1, . . . 9) corresponds to a rule of the following type:

$$CVci(E1, E2)=Mci(E1, E2) *Wci$$

where

CVci is the confidence value for completing E1 on the basis of E2,

Mci is the measure corresponding to one of the criteria ci above (such as the number of words between E1 and E2), Wci is a fixed factor associated with the corresponding criterion ci that defines its relative importance for the calculation of CVci( ) compared with the other criteria.

Both, Wc and Mc will typically be normalized to a range such as 0 . . . 1 yielding to an overall confidence value within the same range. This ensures that confidence values obtained using different criteria can be compared.

The set of candidates for completing E1 is calculated by computing CVc(E1, E2)—see reference sign 7 in FIG. 2—for each selected time citation E2=/=E1—see reference sign 5 in FIG. 2 and each applicable criterion C, see step 170.

Assuming E1 occurs in a document D1, E2 may be
a. extracted from D1, or
b. from a document that can be reached within a certain maximum link-distance from D1 or
c. from the use context of D1.

Examples for candidates obtained from a document's use context are:
  Dates as provided by the operating system, e.g. file creation or modification dates,
  Dates from a database in which the document is stored,
  Dates from a workflow system that transports the document to different processes,
  Dates from different documents within the same directory, database or container, The process starts with an incomplete date citation with the smallest degree of missing information and tries to complete it with sources that provide the missing information. This date can then be used to further complete other incomplete date citations that may have a higher degree of missing information. That means completed dates can basically become a source for completion.

The calculation of confidence values can be stopped if one leads to a confidence value that exceeds a certain threshold, after a certain period of time, of when all available criteria have been applied.

The candidate selected for the completion of E1 is the one with the maximum confidence value. In case the maximum confidence value is shared by more than one candidate, the system uses a conflict resolution strategy to select a single candidate.

If $CVx=max(CVi)$ for all applicable criteria i, and $CVx(E1, E2)=CVy(E1, E3)$ for $E2=/=E3$ one of the following conflict resolution strategies can be applied:
1. Selecting E2, if $Wx>Wy$ (based on criteria weights—not applicable if x=y), otherwise select E3;
2. Defining a criterion z as primary and compare $CVz(E1, E2)$ with $CVz(E1, E3)$. If the former is greater than the latter, select E2, otherwise select E3. Preferably, z should be defined in a way that $CVz(E1, E2)=CVz(E1, E3)$, only if E2=E3. An example for such a z is the distance on the basis of tokens.
3. Presenting the list of candidates with maximum confidence value or with a confidence value above a certain limit to the user so (s)he can select a candidate.

Whether strategy no. 3 is an option at all, depends on the degree of interactivity which is appropriate for the system that carries out the inventive program. If an index is to be created in 'batch mode' any type of user interaction will preferably be prevented, while above option 3. may be an appropriate action when the system is used to do 'historical studies' on a set of given documents.

An advantageous way provided by the present invention is to present to the user the plurality of concurrent "preferred" proposals for completing the date, accompanied by the above mentioned probability value, and an optional indication of the source, i.e., a reference (ref.ID) for where the supplementary information needed for completing the incomplete date was found.

This could be done as follows:

| 2000 | 75% | ref. ID |
| 2001 | 20% | ref. ID |
| 2002 | 5%  | ref. ID |

The evaluation according to the invention may be adapted to any individually different situations to provide better results. For example, the text-embedded information may be more useful to be exploited for completing incomplete dates instead of the first electronic store date. This may apply in situations, for example, in which an archive of historical documents telling stories which lay 300 years in the past is subjected to the inventional method.

Or, when the creation date of a business letter shall be completed, the time information 5 from the document "container", the electronic store date, has a higher priority compared to a date occurring in the text content.

In step 180 the program creates for the incomplete time citation an index table 1, which is shown in FIG. 2. At least in step 190 this index table 1 of an incomplete time citation is displayed to the user.

Thus, as a skilled reader may appreciate, such a historical index may be combined with other text search features, and may be enable for setting up quite abstract queries like:

"Find all documents referring to Mr. X's car accident in December 2000", or

"Find all documents referring to "Boston Tea party in 1774", or the like.

FIG. 2 is a schematic drawing of such an index table 1. It includes an optional type specification 3 for the text-embedded time citations, as e.g.

Type 1=narrative content,

Type 2=signature type (to be mostly applied at the end of a letter or document in general), Type 3=exceptional status, to be applied in cases in which it is obvious that the incomplete date cannot easily be completed, because it is present in a series of further incomplete dates or complete dates, which cite a "turbulent mixture" of different year indications, for example.

Said table further includes the proposed supplemental time specifications 5 and respective confidence values 7. Thus, the user can find the type of each incomplete time citations of a document and all proposed time specifications with their confidence values. The completed date can thus be used as an index as mentioned above.

With reference to FIG. 3 an example is given illustrating the inventional way of using date indications (see the date-related text in the figure) in relation to a text document originally created in a word processor program and later modified and reviewed by the author, for automatically completing an incomplete date depicted in the text of the document having reference sign 10. As can be seen from the figure said date indications are thus located in several sources. They can be found and evaluated according to the present invention in any electronic information, for example:

In the enclosing application like a word processor (see application/database frame), In the operating system providing information about access, creation and modification time, e.g. through a file system, logging- or tracing (see the system operating system frame), in form of a send/create/ or receive date in messaging systems, e.g. mail daemons (not depicted), embedded in the document/content itself, ie, from the textual context itself (see document/content frame).

A potential area in which the invention can be applied is in enriching document archives with documents which were not stored therein before, due to the lack of a complete date as an order criterion.

The inventional program can also be useful for search engines in the Internet. The user may look for example for all documents, which comprise the date of e.g., 13.07.2001 with a confidence value of more than 50% in their text content.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A method for processing a document comprising text and accessed from a data storage system, comprising the steps of:
   detecting incomplete date-related citations within the text of the document accessed from the data storage system;
   searching for supplemental date information from at least one of other date-related indications within the text of the document and meta information associated with the storage of the document in the data storage system from outside the text of the document; and
   automatically completing the incomplete date-related citations by applying the supplemental date information according to at least one set of predetermined completing rules establishing prioritizing relationships between the other date-related indications located within the text of the document and the meta information from outside the text of the document.

2. The method according to claim 1, wherein the step of automatically completing the incomplete date-related citations by applying the supplemental date information according to at least one set of predetermined completing rules establishing prioritizing relationships between the other date-related indications located within the text of the document and the meta information from outside the text of the document, further comprises the step of:
   detecting at least one criteria required for applying the set of predetermined completing rules for the other date-related indications from at least one of:
   a) a distance between the incomplete date-related citations and each of the other date-related indications based on a number of at least one of words and topic transitions in the text of the document between the incomplete date-related citations and each of the other date-related indications;
   b) a number of date expressions between the incomplete date-related citations and each of the other date-related indications;
   c) a number of links to other documents found between the incomplete date-related citations and each of the other date-related indications;
   d) a level of compatibility between a format of the incomplete date-related citations as compared to a separate format of each of the other date-related indications; and
   e) a confidence level associated with the other date-related indications, if the other date-related indications have been obtained by automatic completion from applying supplemental date information to a previously incomplete date-related citation.

3. The method according to claim 1, further comprising the step of
   creating an index from completed date-related citations, usable for selectively storing and/or searching for the document.

4. The method according to claim 3, further comprising the step of updating the index to indicate a particular type of the meta information from among different kinds of meta information applied as supplemental date information to the incomplete date-related citations, the different kinds of meta information comprising at least one of:
   a) the date of publishing the document, or
   b) the date of processing the document, or
   c) the date of creating the document.

5. The method according to claim 4, in which the index comprises a canonical representation of the date indicating the particular type of meta information.

6. The method according to claim 3, further comprising the step of transforming the completed date-related citations into a canonical format.

7. The method according to claim 3, further comprising the step of providing a user interface means for specifying a search for documents through searching the index.

8. The method according to claim 1, further comprising the step of presenting to a user one or more possible date specifications for completing the incomplete date-related citations, each accompanied by a confidence value.

9. A computer system comprising computer hardware having means for performing the steps of a method according to claim 1.

10. A computer program for execution in a data processing system comprising computer hardware and computer program code portions for performing respective steps of the method according to claim 1.

11. A computer program product stored on a computer usable medium comprising computer readable program means for causing a computer to perform the method of claim 1.

12. A method for processing a document comprising text, comprising the steps of:
    detecting incomplete date-related citations within the text of the document;
    completing the incomplete date-related citations by automatically completing the date-related citations by a supplemental date specification by applying either one or more of:
      a set of predetermined completing rules that establish prioritizing relationships between the incomplete date-related citations and other date-related citations within the text of the document;
      prior art text mining technology procedures, or
      context meta information from outside the document; and
    presenting to the user one or more possible date specifications for use in completing the incomplete date-related citations, wherein a confidence value is indicated for each possible date specification.

13. A system comprising computer hardware for processing a document comprising text comprising:
    means for detecting incomplete date-related citations within the text of the document;
    means for completing the incomplete date-related citations by automatically completing the date-related citations by a supplemental date specification by applying either one or more of:
      a set of predetermined completing rules that establish prioritizing relationships between the incomplete date-related citations and other date-related citations within the text of the document;
      prior art text mining technology procedures, or
      context meta information from outside the document; and means for presenting to the user one or more possible date specifications for use in completing the incomplete date-related citations, wherein a confidence value is indicated for each possible date specification.

14. A computer program product, stored on a computer usable medium, comprising computer readable program means for causing a computer to perform the steps of:
    detecting incomplete date-related citations within the text of the document;

completing the incomplete date-related citations by automatically completing the date-related citations by a supplemental date specification by applying either one or more of:
  a set of predetermined completing rules that establish prioritizing relationships between the incomplete date-related citations and other date-related citations within the text of the document;
  prior art text mining technology procedures, or context meta information from outside the document; and
presenting to the user one or more possible date specifications for use in completing the incomplete date-related citations, wherein a confidence value is indicated for each possible date specification.

* * * * *